Patented Oct. 27, 1936

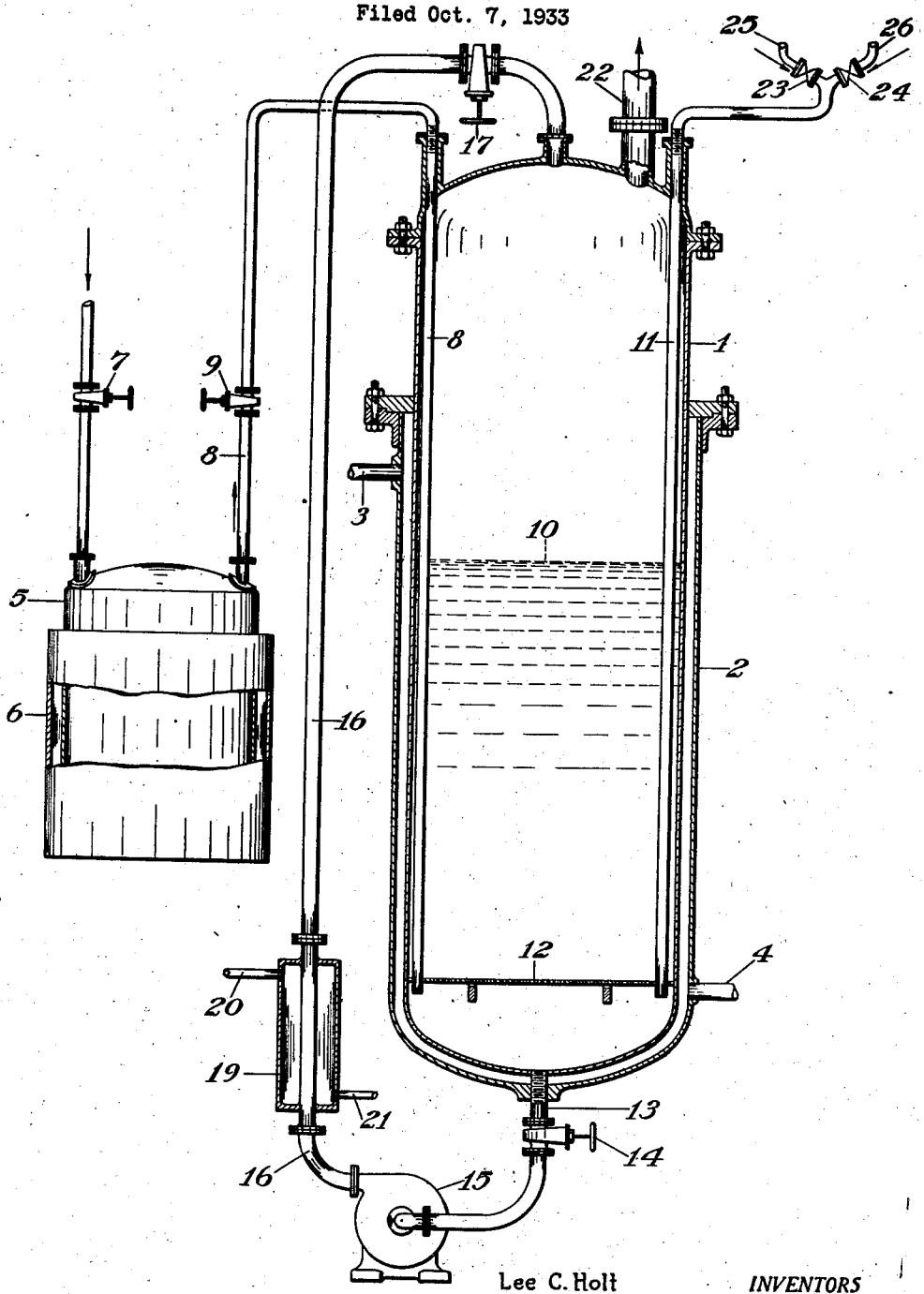

2,058,453

UNITED STATES PATENT OFFICE 2,058,453

FLUORINATION PROCESS AND APPARATUS

Lee Cone Holt, Edgemoor, and Mortimer A. Youker, Wilmington, Del., and Robert F. Laird, Salem, N. J., assignors to Kinetic Chemicals, Inc., Wilmington, Del., a corporation of Delaware Application October 7, 1933, Serial No. 692,682

3 Claims. (Cl. 260—162)

This invention relates to fluorine compounds, more particularly fluorinated acyclic hydrocarbons, and a process and apparatus for the production thereof.

It has been found that organic fluorine compounds may be produced by a continuous process in which hydrogen fluoride and compounds to be fluorinated, as, for example, halogenated acyclic hydrocarbon derivatives containing halogens other than fluorine, are passed into an antimony fluorinating catalyst maintained in liquid phase at reaction temperature. Heretofore, it has been customary to introduce the fluorinating agent and compound to be fluorinated into the antimony catalyst through one or more standpipes extending close to the bottom of the vessel containing the catalyst. The portions of the apparatus that come into contact with the catalyst and the hydrogen halides were usually made of some metal such as copper.

An object of the present invention is to provide a new and improved process for the production of fluorine compounds. A further object is the production of fluorinated acyclic hydrocarbons by a continuous fluorination reaction involving passing hydrogen fluoride and a halogenated acyclic hydrocarbon containing a halogen other than fluorine into an antimony fluorinating catalyst, maintained in liquid phase but characterized by the improvement that greater efficiency of operation is obtained than in processes of the character previously described. A still further object is the provision of a new and improved apparatus for carrying out fluorination reactions. Additional objects are the provision of a process and apparatus for the utilization of hydrogen fluoride in which the materials of construction are not substantially corroded by the reacting materials and are mechanically stronger than materials such as copper. Other objects will appear hereinafter.

These objects are accomplished according to the present invention whereby in producing organic fluorine compounds by reaction of hydrogen fluoride and a compound to be fluorinated in liquid phase, e. g., by passing the hydrogen fluoride and the compound to be fluorinated into an antimony fluorinating catalyst maintained in liquid phase at reaction temperature, the process is characterized by the improvements that: (1) the hydrogen fluoride and compound to be fluorinated are distributed below the surface of the reaction mixture, preferably near the bottom thereof; and (2) the liquid reaction mixture is circulated from the lower part of the reaction zone, if desired through a heat exchanger maintained at reaction temperature, and is distributed in the vapor space above the liquid reaction mixture. The invention is further characterized by the fact that in the utilization of hydrogen fluoride the apparatus is constructed of materials, the use of which was considered impossible prior to this invention.

In the drawing, the single figure represents a view, partly in section, of a form of apparatus falling within the invention.

Referring to the drawing, the apparatus shown comprises a reaction vessel 1, surrounded by jacket 2, which is provided with an inlet means 3 and an outlet means 4 for a heat transfer medium such as may be used in maintaining the desired reaction temperature in vessel 1. The vessel indicated at 5 is a hydrogen fluoride vaporizer provided with a jacket 6 for a heat transfer medium, e. g., steam, a valved inlet line 7 for the introduction of the hydrogen fluoride and an outlet line 8 controlled by valve 9, connecting with reactor 1. Disposed within reactor 1 is a catalyst, generally indicated at 10, into which extend lines 8 and 11 through which the reacting materials, viz., the hydrogen fluoride and the compound to be fluorinated, respectively, are introduced. A means of distributing the reacting materials through the catalyst is provided at 12 by a suitable distributing device, such as a perforated plate. A means of circulating the catalyst-containing reaction mixture is provided by a line 13 extending from the bottom of the reaction vessel through valve 14 to a means of circulation, such as illustrated by pump 15. The circulated material passes through line 16 and valve 17, and is introduced into the vapor space above the reaction mixture. Line 16 is equipped with a heat exchanger 19 provided with an inlet means 20 and an outlet means 21 for the heat exchange medium (e. g., steam). The gaseous reaction products may be withdrawn through a vapor line, indicated at 22. Valves 23 and 24 on lines 25 and 26, respectively, serve to control the rate of introduction of the compound to be fluorinated.

In the fluorination of liquid halogenated acyclic hydrocarbons containing halogens other than fluorine, a portion of the halogenated hydrocarbon to be fluorinated is preferably used to scrub the gaseous reaction products. This scrubbing liquid may then be introduced into the reaction zone through line 26 which may be connected to the scrubber (not shown).

With regard to the materials of construction, reactor 1 and pump 15 are preferably constructed of cast iron. Vaporizer 5 is preferably constructed of steel. Heat exchanger 19 is preferably constructed of cast iron or bronze. Scrubbers in which gaseous reaction products are scrubbed with halogenated acyclic hydrocarbons have been constructed of iron or alloys thereof, such as steel, with good results. Brass valves are preferably used. Lines 13 and 16 are preferably brass. Lines 7, 8, 11, 22, 25 and 26 are preferably copper or steel. Other materials, such as lead and Monel metal, have been used in various portions of the apparatus satisfactorily. Generally speaking, when the fluorination is in liquid phase, as herein described, cast iron has given the best results. Where the hydrogen halides in vapor phase contact with portions of the apparatus, it is preferable to use steel. At high temperatures and pressures, either in liquid or vapor phase reaction, it is preferable to employ the so-called "stainless" steels, for example, nickel steels, chromium steels, and molybdenum steels, containing enough of the non-ferrous metal to render the steel austenitic and nonmagnetic. An example of such a steel is one containing 18% chromium and 8% nickel, the remainder being substantially iron and other customary ingredients. In general, in the preparation of the hydrogen fluoride and its subsequent use, e. g., for fluorination as herein described, iron materials of construction may be used satisfactorily, provided the ratio of the hydrogen fluoride to water is not less than about 50%. Especially desirable results are obtained with iron materials of construction when the hydrogen fluoride concentration is above 70%.

It will be recognized that the arrangement of the apparatus may be varied somewhat. Thus, the reaction vessel 1 may be provided with other inlet means for materials which it may be desirable to use in effecting the reaction, as, for example, a free halogen. All of the lines in the circulating system are preferably covered with some heat insulating material. If desired, the vaporizer 5 may be omitted from the construction of the apparatus.

The invention will be further understood by the following example, in which the process is described with reference to a specific fluorination reaction. The proportions are given in parts by weight.

*Example*

The reaction was effected in an apparatus such as described in the drawing. The reaction vessel 1 had a height of more than twice its diameter. It was constructed of cast iron and heated by means of steam introduced into jacket 2 through line 3 and withdrawn through line 4.

The operation was begun by adding about 600 parts of antimony pentachloride to the reaction vessel 1, this amount being approximately sufficient to fill the vessel to the level indicated in the drawing. The temperature was maintained at about 60° C. Over a period of about twenty-five hours 500 parts of substantially dry hydrogen fluoride were passed into the vaporizer 5 through valved inlet 7, the gaseous hydrogen fluoride then passing into the reaction vessel through line 8 and valve 9. During this time, 1925 parts of carbon tetrachloride were introduced into the reaction vessel through line 11. In starting the reaction, all of the carbon tetrachloride was introduced into line 11 from line 25, controlled by valve 23, line 25 communicating with a storage vessel containing carbon tetrachloride. After the reaction had started, valve 23 was closed, or partly closed, and the carbon tetrachloride was introduced into line 11 through line 26 controlled by valve 24, line 26 connecting with carbon tetrachloride scrubbers (not shown) through which the gaseous fluorinated products from line 22 were passed. Carbon tetrachloride scrubbers were constructed of steel. The valves 14, 17, 23 and 24 were constructed of brass. The reaction vessel 1 was constructed of cast iron. Lines 8, 11, 22, 25 and 26 were constructed of steel. Lines 13 and 16 were constructed of brass. The pump 15 was constructed of cast iron, the heat exchanger 19 of bronze.

The hydrogen fluoride and carbon tetrachloride introduced into the reaction vessel through lines 8 and 11, respectively, were distributed homogeneously through the catalyst by means of a perforated cast iron plate, illustrated at 12. During the reaction, the catalyst-containing reaction mixture was continuously circulated through line 13, valve 14, pump 15, line 16, heat exchanger 19 and valve 17 to the vapor space above the reaction mixture into which the circulated material was distributed. The heat exchanger was maintained at a temperature of about 110° C.

The vaporized products comprising substantially hydrochloric acid, fluoro-trichloro methane and difluorodichloro methane, together with small quantities of unconsumed hydrogen fluoride and carbon tetrachloride were passed through line 22 to a warm and a cold carbon tetrachloride scrubber (not shown) in the order named, the second scrubber refluxing back to the first.

The residual gases were then further purified by passing them through water, aqueous alkaline hydroxide solution and concentrated sulfuric acid, and then subjecting them to condensation. Difluoro-dichloro methane in excellent yield was obtained.

The procedure and apparatus described in the example are applicable generally to liquid phase fluorination processes. It will be understood, however, that conditions of temperature, pressure and the exact method of procedure may vary widely, depending largely upon the compound fluorinated and the results desired. As examples of compounds which may be fluorinated in the manner described may be mentioned hexachloro ethane, pentachloro ethane, tetrachloro ethane, dichloro ethane, ethyl chloride, dichloro ethylene, trichloro ethylene, perchloro ethylene, ethylene dibromide, tribromo ethane, carbon tetrachloride, chloroform, methylene chloride, tetrachloro butane, tetrabromo butane, allyl bromide, bromoform, hexachloro hexylene, fluoro-trichloro methane, fluoro-dichloro methane and higher halogenated aliphatic hydrocarbons. The apparatus described may likewise be used in the fluorination of other organic compounds, as, for example, benzo-trichloride, benzo-tribromide, benzo-fluorochloride, benzo-fluorodichloride, chlorinated xylenes, e. g., chloro-1:3-di(trichloromethyl) benzenes, and the like. In the production of compounds having relatively high boiling points, such as benzo-trifluoride, or compounds which may be decomposed at temperatures below the temperatures at which they vaporize, it will be recognized that the reaction products may not be recovered in the form of gases, as described in the example, but will be recovered directly in liquid or solid form from the reaction mixture. Furthermore, in the fluorination of compounds containing aromatic rings, it is desirable to use relatively small proportions of the antimony halide catalyst.

In carrying out the fluorination, it may be desirable to add a free halogen (e. g., chlorine or bromine) to the reaction mixture. If the compound to be fluorinated contains hydrogen, the presence of added free halogen may cause substitution of the hydrogen by halogen. Likewise, if free halogen is added to the reaction zone and the compound to be fluorinated is unsaturated, saturation of the unsaturated linkages occurs. A free halogen also serves to keep the antimony halide catalyst in pentavalent form.

The nature of the catalyst used is subject to variation but, in general, good results have been obtained in the use of an antimony halide catalyst, preferably pentavalent antimony halide. The presence of antimony trihalides is beneficial in reducing the vapor pressure of the catalyst and its ease of dissociation. The antimony catalysts which have been found to be particularly valuable are those containing compounds of the type

SbF$_x$Hal$_{5-x}$ in which Hal represents a halogen other than fluorine, and $x$ represents a positive value less than 5.

In order to maintain the desired degree of fluidity in the antimony-containing reaction mass, inert materials, for example, a previously fluorinated compound liquid at the temperature employed or a highly halogenated aryl compound, or the like, may be used. The presence of trivalent antimony halides and the use of high temperatures also tends to increase the fluidity of the antimony-containing reaction mass. When operating under high temperatures, it is desirable to use super-atmospheric pressures. Super-atmospheric pressures may also be used at lower temperatures, e. g., 45° C. to 95° C.

The compound to be fluorinated may be introduced into the reaction zone in a solvent; thus, hexachloro ethane may be dissolved in trifluoro trichloro ethane prior to its introduction into the reaction zone.

The apparatus may be constructed to withstand atmospheric, sub-atmospheric or super-atmospheric pressure and a wide degree of temperature range, according to the operating conditions.

By the application of the invention, it has been possible to obtain greater efficiency in the production of fluorinated compounds than according to previously known processes and apparatus. The circulation of the reaction mixture through a heat exchanger serves a number of useful purposes. The catalyst is agitated thoroughly and a greater contact between the catalyst and the reacting materials is obtained as the re-circulated material enters the top of the reaction zone. The heat which is supplied by the heat exchanger assists materially in maintaining proper temperature conditions. A part of the chemical reaction takes place during the passage of the reaction mixture through the heat exchanger. The distribution of the reacting materials in the lower part of the reaction mixture also greatly facilitates contact with the catalyst. Further reaction occurs by the distribution of the reaction mass in the vapor space above the liquid reaction mixture. The reaction may, therefore, be considered as occurring partly in liquid and partly in vapor phase. The advantages of using steel and iron for the construction of the various portions of the apparatus will be apparent. That such materials could be used could not be foreseen on account of the well known high reactivity of fluorine compounds, particularly hydrogen fluoride. From the commercial standpoint, these materials are particularly valuable because of their comparatively low cost.

By the expression "substantially iron" it is intended to include cast irons (e. g., grey and white cast irons) and steel.

As many apparently widely different embodiments of this invention may be made without departing from the spirit and scope thereof, it is to be understood that we do not limit ourselves to the specific embodiments thereof except as defined in the following claims.

We claim:
1. In the production of fluorine compounds, the steps which comprise vaporizing substantially anhydrous hydrogen fluoride by contacting it with steel heated above the vaporization temperature, introducing the gaseous hydrogen fluoride into a mixture of antimony trichloride and antimony pentachloride contained in a vessel made of an iron material, thereafter continuously introducing hydrogen fluoride and a halogenated acyclic hydrocarbon containing at least one acyclic carbon atom having attached thereto at least one halogen atom other than fluorine into the reaction mixture, continuously circulating the liquid antimony halide-containing reaction mixture from the lower part of the reaction zone to a vapor space above and in contact with the reaction mixture, continuously removing the gaseous reaction products from the reaction zone and passing them through at least one scrubbing liquid comprising substantially the halogenated acyclic hydrocarbon to be fluorinated, said scrubbing being effected in vessels the interior of which is formed of an iron material.

2. In the production of fluorine compounds, the steps which comprise vaporizing substantially anhydrous hydrogen fluoride by contacting it with steel heated above the vaporization temperature, introducing the gaseous hydrogen fluoride into a mixture of antimony trichloride and antimony pentachloride contained in a vessel constructed of an iron material, thereafter continuously introducing the hydrogen fluoride and carbon tetrachloride into the resultant reaction mass while maintaining it liquid, continuously circulating the liquid antimony halide-containing reaction mixture from the lower part of the reaction zone to a vapor space above and in contact with the reaction mixture, continuously removing the gaseous reaction products from the reaction zone and passing them through at least one scrubbing liquid comprising substantially carbon tetrachloride, said scrubbing being effected in vessels the interior of which is formed of a metal comprising substantially iron.

3. In an apparatus for the production of fluorinated acyclic hydrocarbons by reaction of chloro acyclic hydrocarbons containing less than three carbon atoms and substantially anhydrous hydrofluoric acid in the presence of a liquid antimony fluorochloride, the combination of: a steel vaporizer for vaporizing the hydrogen fluoride, a cast iron reaction vessel in which the antimony fluorochloride is disposed, means for maintaining reaction temperature in the reaction vessel, means for the introduction of hydrogen fluoride from the vaporizer to a point below the liquid level in the reaction vessel, means for the introduction of the chloro acyclic hydrocarbons below the liquid level in the reaction vessel, means for distributing the introduced hydrogen fluoride and chloro acyclic hydrocarbon in the reaction mixture, means for circulating the reaction mixture externally to a vapor space above the liquid mixture in the reaction vessel, outlet means for gaseous reaction products, and means for scrubbing said gaseous reaction products with the chloro acyclic hydrocarbon in a steel vessel.

LEE CONE HOLT.
MORTIMER A. YOUKER.
ROBERT F. LAIRD.